(12) United States Patent
Chou

(10) Patent No.: US 8,202,029 B2
(45) Date of Patent: Jun. 19, 2012

(54) CARGO BAR

(75) Inventor: Yeh-Chien Chou, Taoyuan County (TW)

(73) Assignee: Strong Yun Industrial Co., Ltd., Taoyuan County (TW)

( * ) Notice: Subject to any disclaimer, the term of this patent is extended or adjusted under 35 U.S.C. 154(b) by 45 days.

(21) Appl. No.: 12/890,606

(22) Filed: Sep. 25, 2010

(65) Prior Publication Data

US 2012/0076609 A1    Mar. 29, 2012

(51) Int. Cl.
*B61D 45/00* (2006.01)
(52) U.S. Cl. ....................................................... 410/143
(58) Field of Classification Search ............ 410/143, 410/145, 151; 211/105.3; 248/354.6, 354.7; 254/12, 95, 108, 112, 247; 74/141.5, 167, 74/169
See application file for complete search history.

(56) References Cited

U.S. PATENT DOCUMENTS

| 5,443,342 A | * | 8/1995 | Huang | 410/151 |
| 5,769,580 A | * | 6/1998 | Purvis | 410/151 |
| 5,833,414 A | * | 11/1998 | Feldman et al. | 410/151 |
| 5,947,666 A | * | 9/1999 | Huang | 410/151 |
| 6,247,882 B1 | * | 6/2001 | Huang | 410/151 |
| 8,043,037 B2 | * | 10/2011 | Ruan | 410/151 |

FOREIGN PATENT DOCUMENTS

EP           404745 A1  * 12/1990

* cited by examiner

*Primary Examiner* — H Gutman

(57) ABSTRACT

The cargo bar of the invention includes a telescoping rod composed of an outer tube and an inner tube. One end of a toothed rail is fastened on the inner tube and the other end thereof longitudinally extends along the outer tube so that the toothed rail can move with the inner tube. An iron assembly, which is composed of a housing and a U-shaped bracket, is fixed at one end of the outer tube. The U-shaped bracket accommodates the toothed rail and pivotally connects a handle. A plurality of cogs are formed on the pivotal end of the handle. When the handle is closed, the cogs engage with the toothed rail so as to jam the inner tube. That is, the total length formed by the two tubes stays fixed. When the handle is opened, the cogs disengage with the toothed rail so as to make the inner tube become adjustable.

13 Claims, 7 Drawing Sheets

CARGO BAR

BACKGROUND OF THE INVENTION

1. Technical Field The invention generally relates to restraints of cargo, particularly to cargo bars used in truck bodies to prevent cargo from moving while in transportation.

2. Related Art

The cargo loaded in a truck body or container usually needs a cargo bar to prevent it from scattering or impacting. A cargo bar is a retractable rod whose two ends are separately provided with two rubber pads for bearing against the truck walls (or the floor and ceiling).

U.S. Pat. No. 5,443,342 discloses a typical ratchet type cargo bar. This cargo bar is axially provided with a toothed rail on a telescoping rod. The toothed rail pivotally connects a handle. The pivotal end of the handle is provided with a ratchet wheel engaging with the toothed rail. By the reciprocation of the handle and unidirectional driving of the ratchet wheel, the toothed rail only can be unidirectionally moved to adjust length. However, this arrangement requires a ratchet wheel, which has complicated structure and expensive cost. On the other hand, lengthen the telescoping rod completely depends on the engagement motion between the ratchet wheel and toothed rail. No matter how long the length to be lengthened is, the engagement motion is always needed. Thus, both the toothed rail and ratchet wheel require prolonged engagement. Additionally, the conventional toothed rail is made of cast aluminum or cast copper, so they tend to be fractured because of insufficient strength. As a result, this kind of cargo bar does not have great durability. Moreover, their manufacturing costs are pretty high.

SUMMARY OF THE INVENTION

A primary object of the invention is to provide a cargo bar which does not require a ratchet so as to have simplified structure, reinforced strength and reduced costs.

A secondary object of the invention is to provide a cargo bar which divides the length adjustment process into two stages. The first stage is coarse tuning in which the length can be freely adjusted without any engagement of gear. The second stage is fine tuning with engagement motion. Thus the engagement between gears can be substantially reduced and the abrasion also can be retarded.

To accomplish the above objects, the cargo bar of the invention includes a telescoping rod composed of an outer tube and an inner tube. One end of a toothed rail is fastened on the inner tube and the other end thereof longitudinally extends along the outer tube so that the toothed rail can move with the inner tube. An iron assembly, which is composed of a housing and a U-shaped bracket, is fixed at one end of the outer tube. The U-shaped bracket accommodates the toothed rail and pivotally connects a handle. A plurality of cogs are formed on the pivotal end of the handle. When the handle is closed, the cogs engage with the toothed rail so as to jam the inner tube. That is, the total length formed by the two tubes stays fixed. When the handle is opened, the cogs disengage with the toothed rail so as to make the inner tube become adjustable.

DETAILED DESCRIPTION OF THE INVENTION

Figure 1:
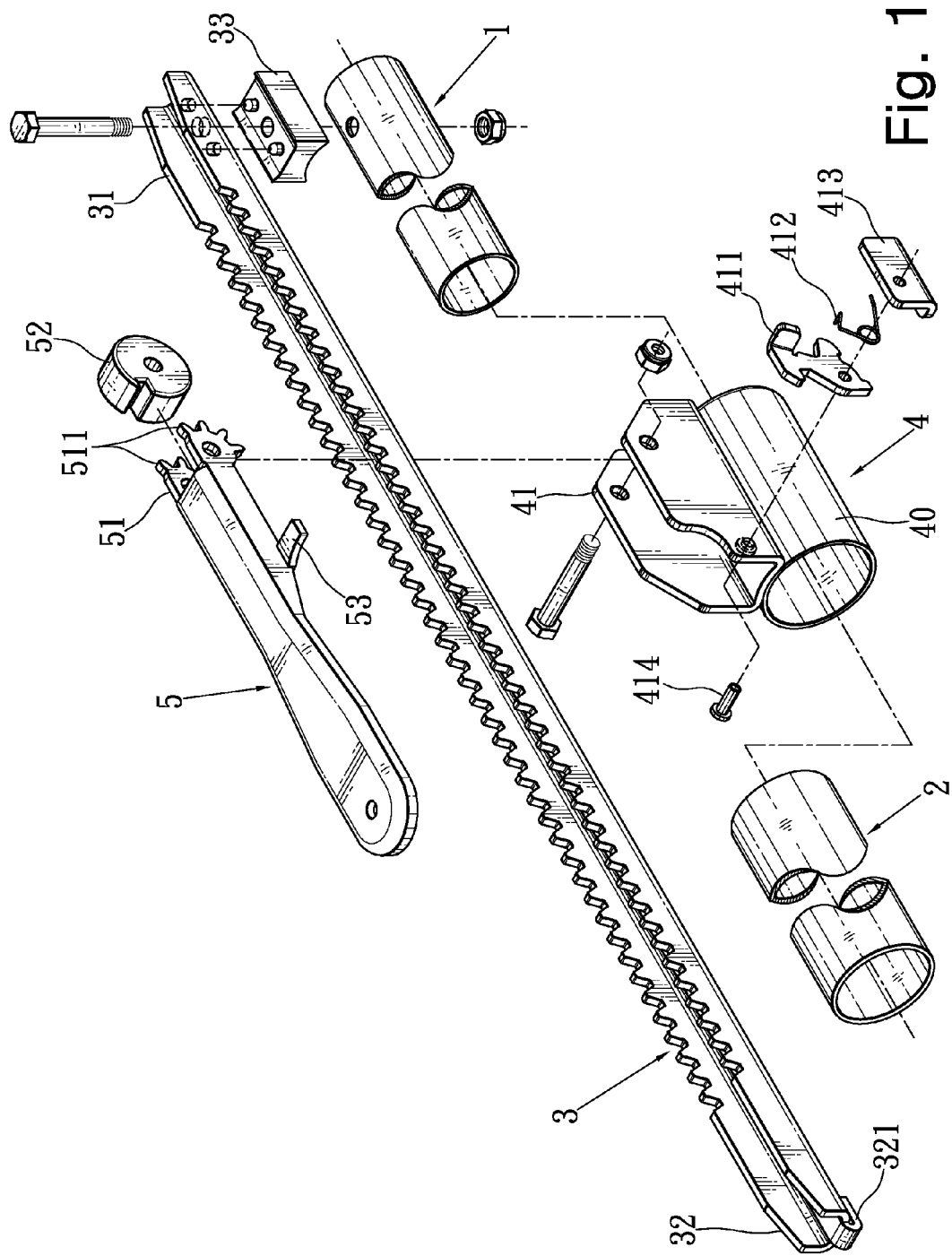
FIG. 1 is an exploded perspective view of the invention.
Figure 2:
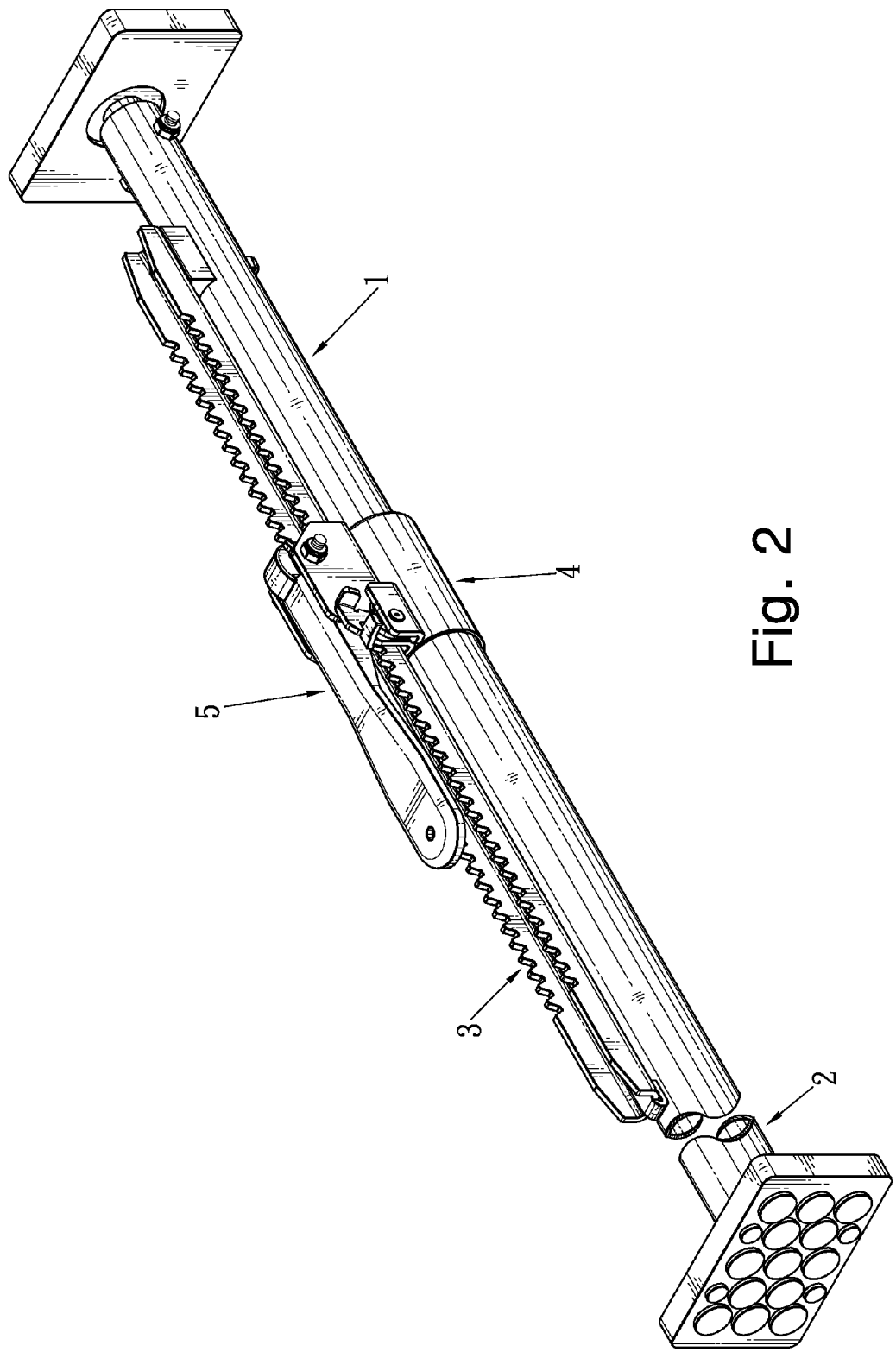
FIG. 2 is an assembled perspective view of the invention.

Please refer to FIGS. 1 and 2, which are an exploded perspective view and an assembled perspective view, respectively. Basically, the cargo bar of the invention is a telescoping rod composed of an inner tube 1 and an outer tube 2. The inner tube 1 slidably penetrates into the outer tube 2. One end of a toothed rail 3, which is the fixed end 31, is fastened on the inner tube 1. A pad 33 is sandwiched between the fixed end 31 and inner tube 1 so as to keep the toothed rail 3 parallel to the inner tube 1 as well as the outer tube 2. The other end of the toothed rail 3, which is the free end 32, extends axially towards the outer tube 2 without fastening. Thus the tooth rail 3 can move with the inner tube 1. A hook 321 is extended from the free end 32. The hook 321 functions as the pad 33 for keeping the toothed rail 3 parallel to the outer tube 1.

Figure 3:
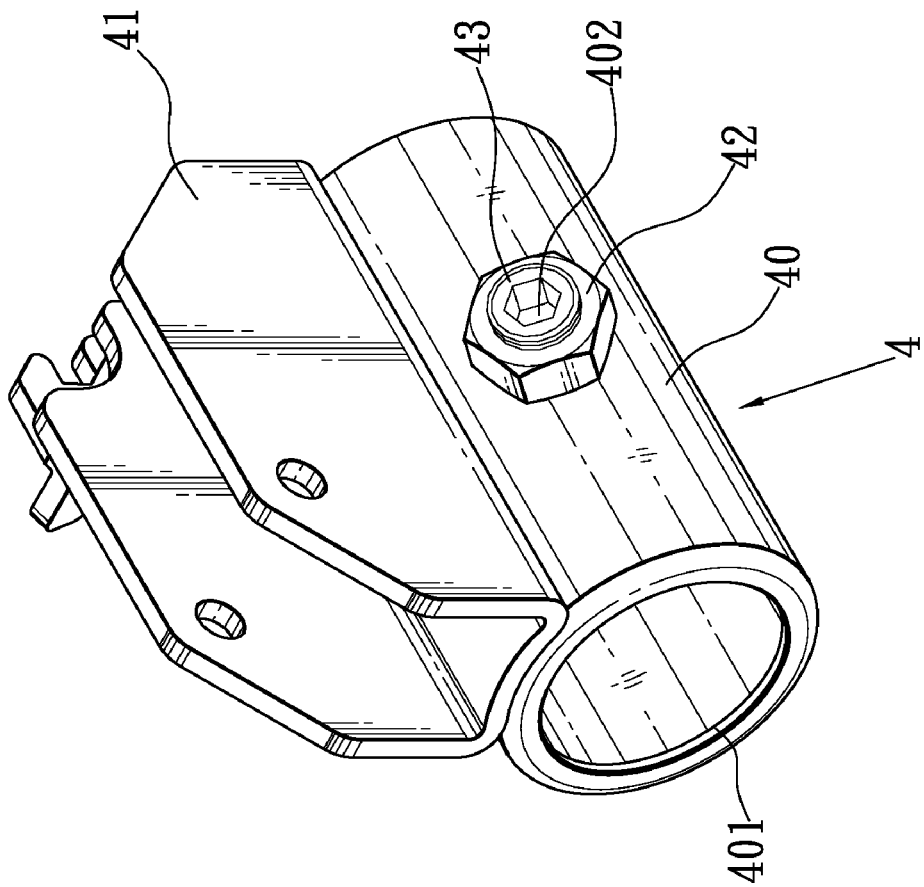
FIG. 3 is a perspective view of the iron assembly.

One end of the outer tube 2, which meets the inner tube 1, is provided with an iron assembly 4 composed of a housing 40 and a U-shaped bracket 41 fixed thereon. As shown in FIG. 3, one end of the housing 40 is formed with a shrunk opening 401 through which the inner tube 1 penetrates. The toothed rail 3 is accommodated in the U-shaped bracket 41. A nut 42 is welded in a through hole 401 of the housing 40 and a hex socket head screw 43 is screwed in the nut 42 to fasten the housing on the outer tube 2.

Referring back to FIGS. 1 and 2, one end of a handle 5, which is the pivotal end 51, is pivotally connected on the U-shaped bracket 41. A plurality of cogs 511 are formed on the pivotal end 51. In a preferred embodiment as shown in the drawings, the cogs 511 are formed on two parallel sheets, and a guiding disk 52 is sandwiched between the two sided cogs 511 for keeping a gap therebetween and preventing the cogs 511 from deforming because of slantwise or excessive force exertion.

A protrudent board 53 is extended from the middle of the handle 5. The U-shaped bracket 41 is pivotally connected by a safety catch 411 corresponding to the protrudent board 53. The safety catch 411 is pivotally fixed between the U-shaped bracket 41 and a mounting plate 413 with being penetrated by a spindle 414. A spring 412 is put around the spindle 414 for normally exerting a force towards the protrudent board 53 to the safety catch 411. When the handle 5 is closed downwards to a position substantially parallel to the two tubes 1, 2, the protrudent board 53 will be embedded into the safety catch 411. At this time, the protrudent board 53 is stemmed by the safety catch 411 so as to not be able to be opened. Thus the handle 5 can be prevented from getting loose as shown in FIG. 2. When a slight force is exerted on the safety catch 411, the handle 5 will escape from the stemming of the safety catch 411. Thus the handle 5 can be restored to be movable.

Figure 4:
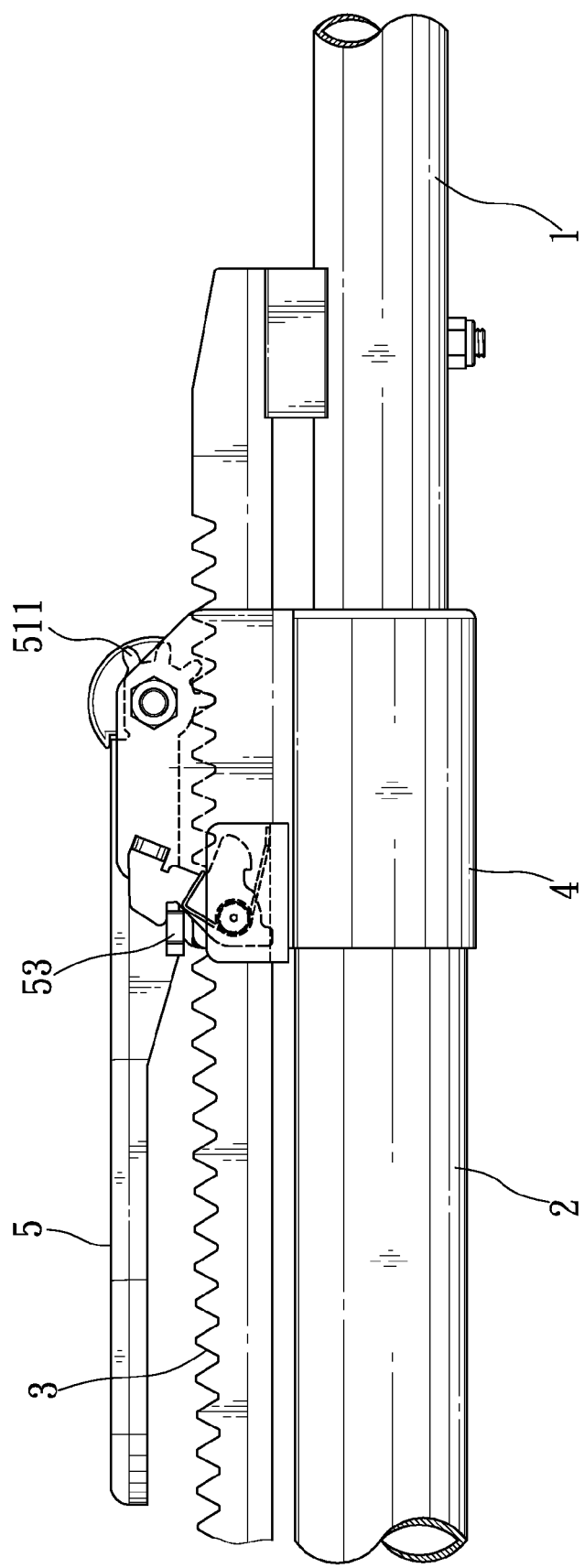
FIG. 4 is a side plan view of the invention in a locked status.
Figure 5:
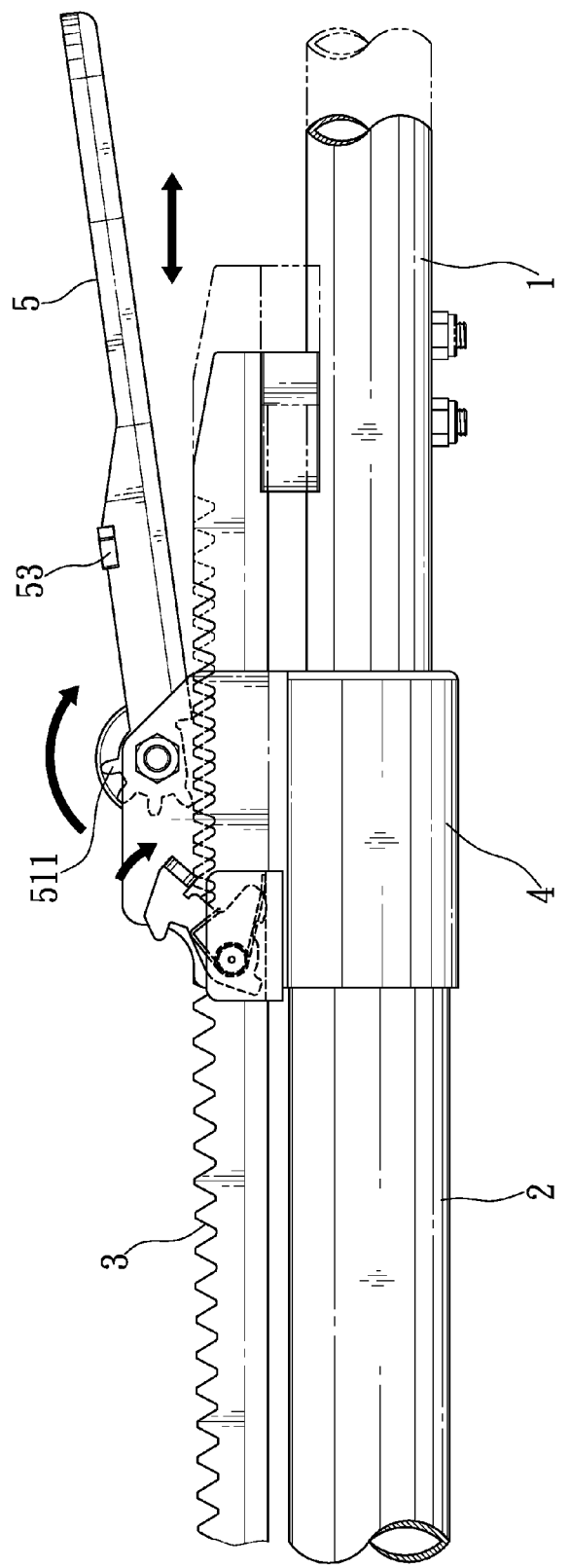
FIG. 5 is a side plan view of the invention in an adjustable status.
Figure 6:
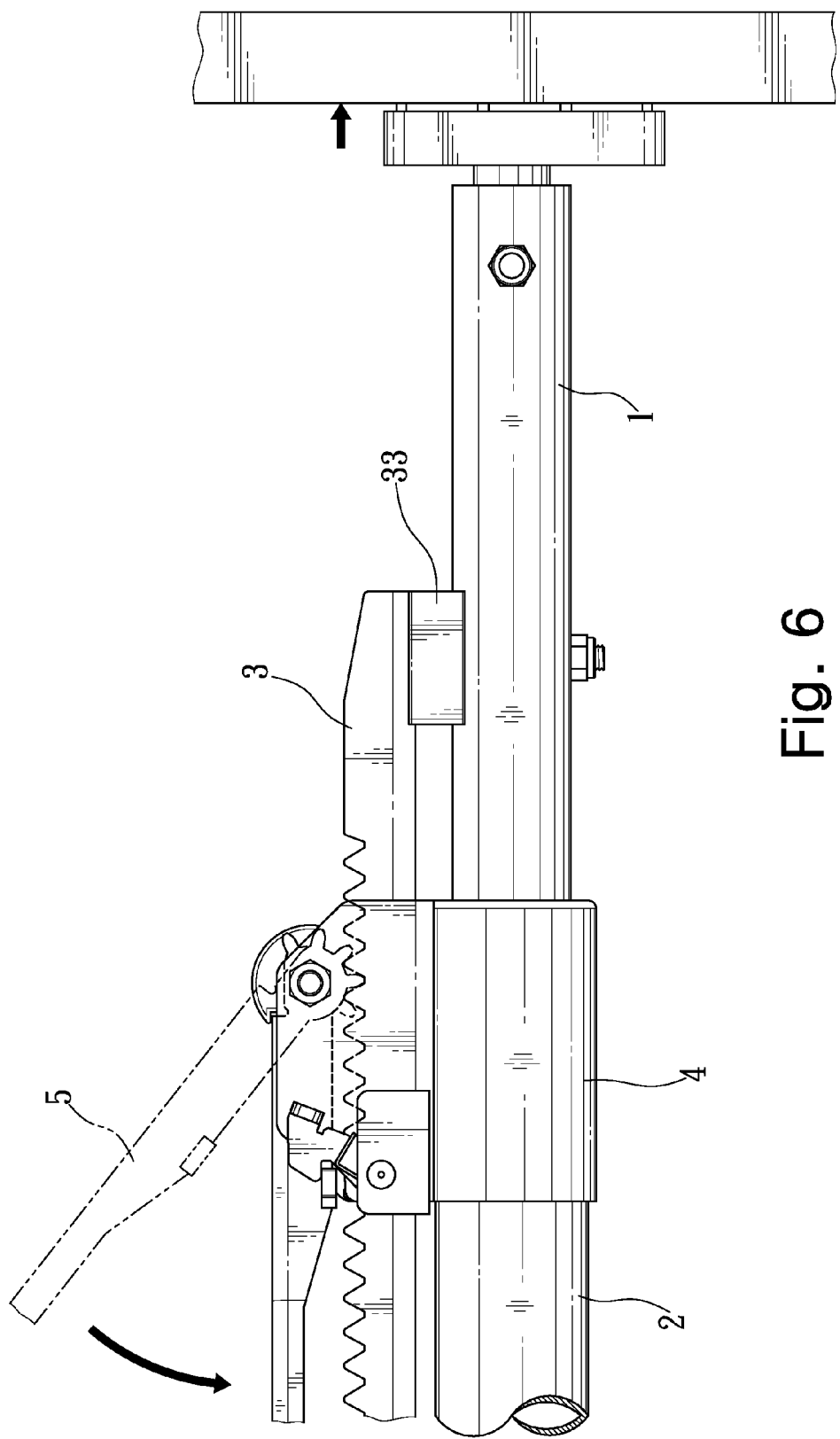
FIG. 6 is a schematic view showing the engagement of the cogs and toothed rail.
Figure 7:
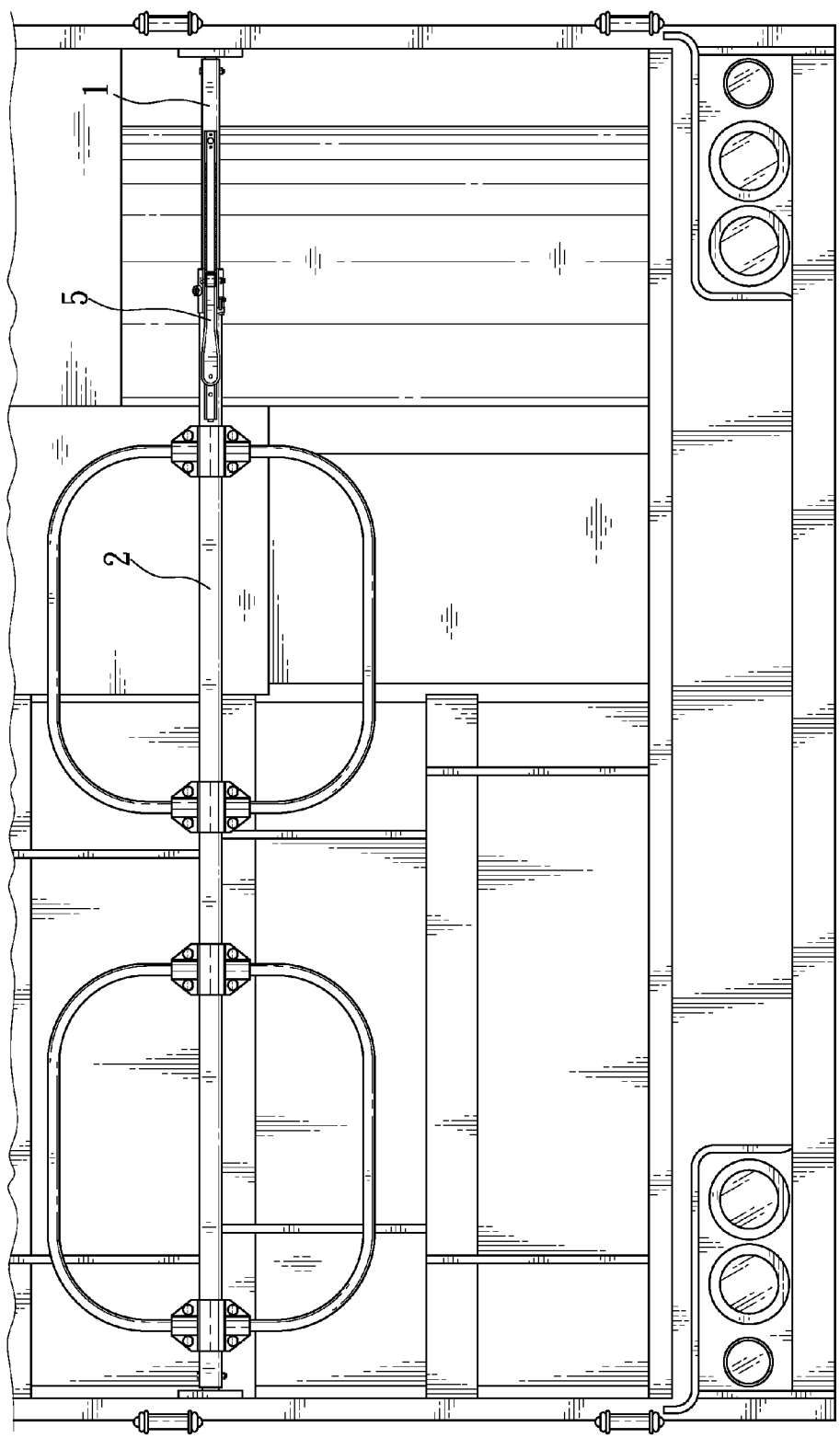
FIG. 7 is a schematic view of the cargo bar in use.

Please refer to FIGS. 4 and 5. The cogs 511 are corresponding to the toothed rail 3 in shape and position. The cogs 511 are a part of the handle 5, so the cogs 511 move with the handle 5. When the handle 5 is rotated upwards (i.e. towards the inner tube 1) to about 180 degrees, as shown in FIG. 5, the cogs 511 will disengage with the toothed rail 3 and the inner tube 1 will be able to be freely moved. This is coarse tuning. A user may employ this coarse tuning to lengthen or shorten the inner tube 1 and outer tube 2 to a length slightly shorter than the length which is really required. Then, the handle 5 may be rotated towards the opposite side (i.e. the outer tube 2)

as shown in FIGS. 4 and 6. The cogs 511 will engage with the toothed rail 5 again and the inner tube 1 will also be moved. This is fine tuning. But when the handle 5 is completely closed, the cogs 511 and toothed rail 3 will not move any longer. And as abovementioned, the protrudent board 53 of the handle 5 will be stemmed by the safety catch 411, so the inner tube 1 cannot move inwards. At this time, the total length formed by the inner tube 1 and outer tube 2 has been fixed. Hence, the adjusted handle bar can be used to bear against the two opposite walls for stabilizing the cargo as shown in FIG. 7.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A cargo bar comprising:
an outer tube;
an inner tube slidably penetrating into the outer tube;
a toothed rail whose a fixed end is fastened on the inner tube and a free end axially extends towards the outer tube;
an iron assembly comprising:
 a housing on an end of the outer tube, having a shrunk opening for being penetrated by the inner tube; and
 a U-shaped bracket welded on the housing for accommodating the toothed rail;
a handle whose pivotal end is pivotally connected to the U-shaped bracket, the pivotal end being provided with a plurality of cogs corresponding to the toothed rail; and
a pad sandwiched between the inner tube and the fixed end for keeping the toothed rail parallel to the inner tube;
wherein when the handle is opened, the inner tube can be freely moved to adjust length; when the handle is closing, the cogs rotate with the handle to engage with the toothed rail; and when the handle is completely closed, the inner tube is fixed.

2. The cargo bar of claim 1, wherein a nut is welded in a through hole of the housing and a hex socket head screw is screwed in the nut to fasten the housing on the outer tube.

3. The cargo bar of claim 1, wherein a protrudent board is extended from the handle, the U-shaped bracket is pivotally connected by a safety catch corresponding to the protrudent board, and the safety catch normally stems the protrudent board to prevent the handle from moving.

4. The cargo bar of claim 3, wherein the safety catch is pivotally fixed between the U-shaped bracket and a mounting plate with being penetrated by a spindle, and a spring is put around the spindle for normally exerting a force towards the protrudent board to the safety catch.

5. A cargo bar comprising:
an outer tube;
an inner tube slidably penetrating into the outer tube;
a toothed rail whose a fixed end is fastened on the inner tube and a free end axially extends towards the outer tube;
an iron assembly comprising:
 a housing on an end of the outer tube, having a shrunk opening for being penetrated by the inner tube; and
 a U-shaped bracket welded on the housing for accommodating the toothed rail;
a handle whose pivotal end is pivotally connected to the U-shaped bracket, the pivotal end being provided with a plurality of cogs corresponding to the toothed rail; and
a hook extending from the free end of the toothed rail for keeping a gap between the toothed rail and the outer tube
wherein when the handle is opened, the inner tube can be freely moved to adjust length; when the handle is closing, the cogs rotate with the handle to engage with the toothed rail; and when the handle is completely closed, the inner tube is fixed.

6. The cargo bar of claim 5, wherein a nut is welded in a through hole of the housing and a hex socket head screw is screwed in the nut to fasten the housing on the outer tube.

7. The cargo bar of claim 5, wherein a protrudent board is extended from the handle, the U-shaped bracket is pivotally connected by a safety catch corresponding to the protrudent board, and the safety catch normally stems the protrudent board to prevent the handle from moving.

8. The cargo bar of claim 7, wherein the safety catch is pivotally fixed between the U-shaped bracket and a mounting plate with being penetrated by a spindle, and a spring is put around the spindle for normally exerting a force towards the protrudent board to the safety catch.

9. A cargo bar comprising:
an outer tube;
an inner tube slidably penetrating into the outer tube;
a toothed rail whose a fixed end is fastened on the inner tube and a free end axially extends towards the outer tube;
an iron assembly comprising:
 a housing on an end of the outer tube, having a shrunk opening for being penetrated by the inner tube; and
 a U-shaped bracket welded on the housing for accommodating the toothed rail; and
a handle whose pivotal end is pivotally connected to the U-shaped bracket, the pivotal end being provided with a plurality of cogs corresponding to the toothed rail;
wherein when the handle is opened, the inner tube can be freely moved to adjust length; when the handle is closing, the cogs rotate with the handle to engage with the toothed rail; and when the handle is completely closed, the inner tube is fixed; and the cogs are formed on two parallel sheets.

10. The cargo bar of claim 9, further comprising a guiding disk sandwiched between the two sided cogs.

11. The cargo bar of claim 9, wherein a nut is welded in a through hole of the housing and a hex socket head screw is screwed in the nut to fasten the housing on the outer tube.

12. The cargo bar of claim 9, wherein a protrudent board is extended from the handle, the U-shaped bracket is pivotally connected by a safety catch corresponding to the protrudent board, and the safety catch normally stems the protrudent board to prevent the handle from moving.

13. The cargo bar of claim 12, wherein the safety catch is pivotally fixed between the U-shaped bracket and a mounting plate with being penetrated by a spindle, and a spring is put around the spindle for normally exerting a force towards the protrudent board to the safety catch.

* * * * *